Dec. 31, 1963    J. C. WINTERS    3,115,766
GAS CHROMATOGRAPHY APPARATUS
Filed Nov. 22, 1957    2 Sheets-Sheet 2
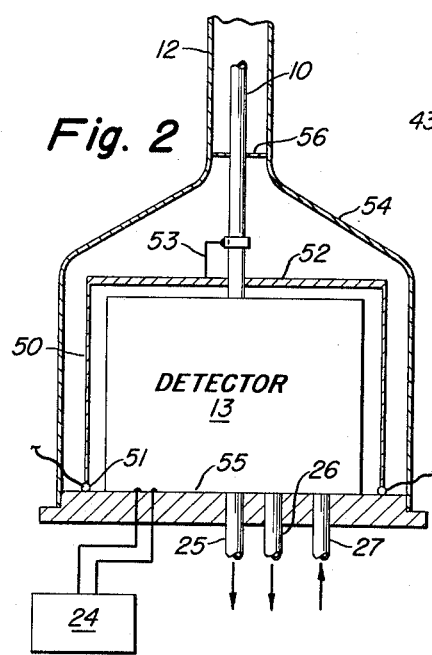
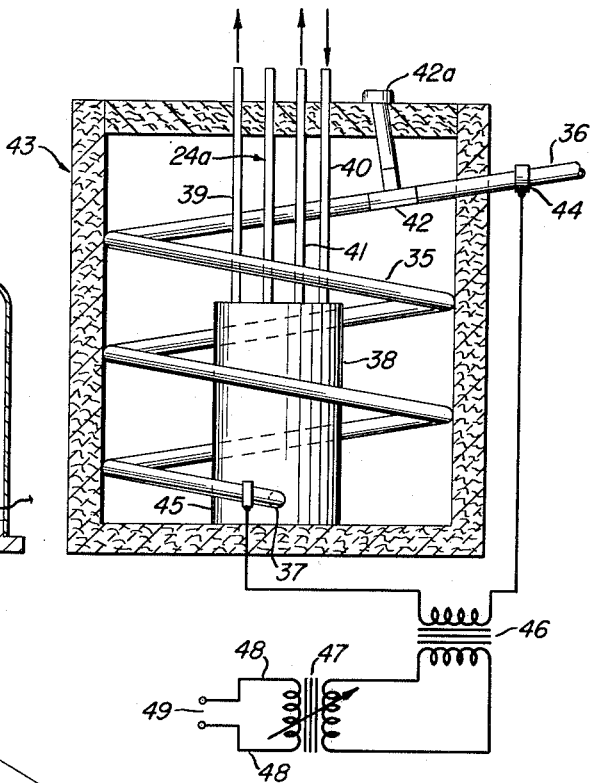
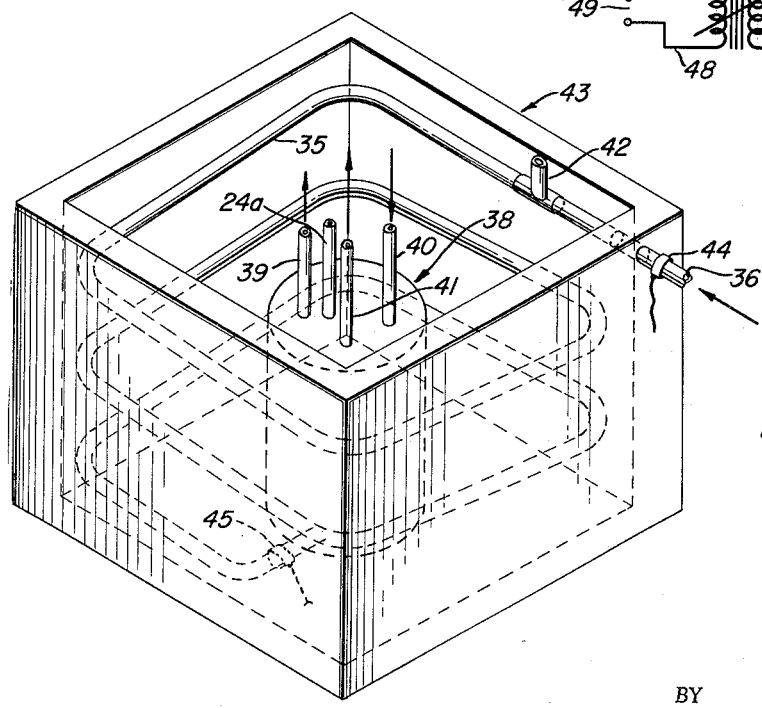
INVENTOR.
John C. Winters
BY
Everett A. Johnson
ATTORNEY 3,115,766
GAS CHROMATOGRAPHY APPARATUS
John C. Winters, Highland, Ind., assignor to Standard Oil Company, Chicago, Ill., a corporation of Indiana
Filed Nov. 22, 1957, Ser. No. 698,202
10 Claims. (Cl. 73—23)

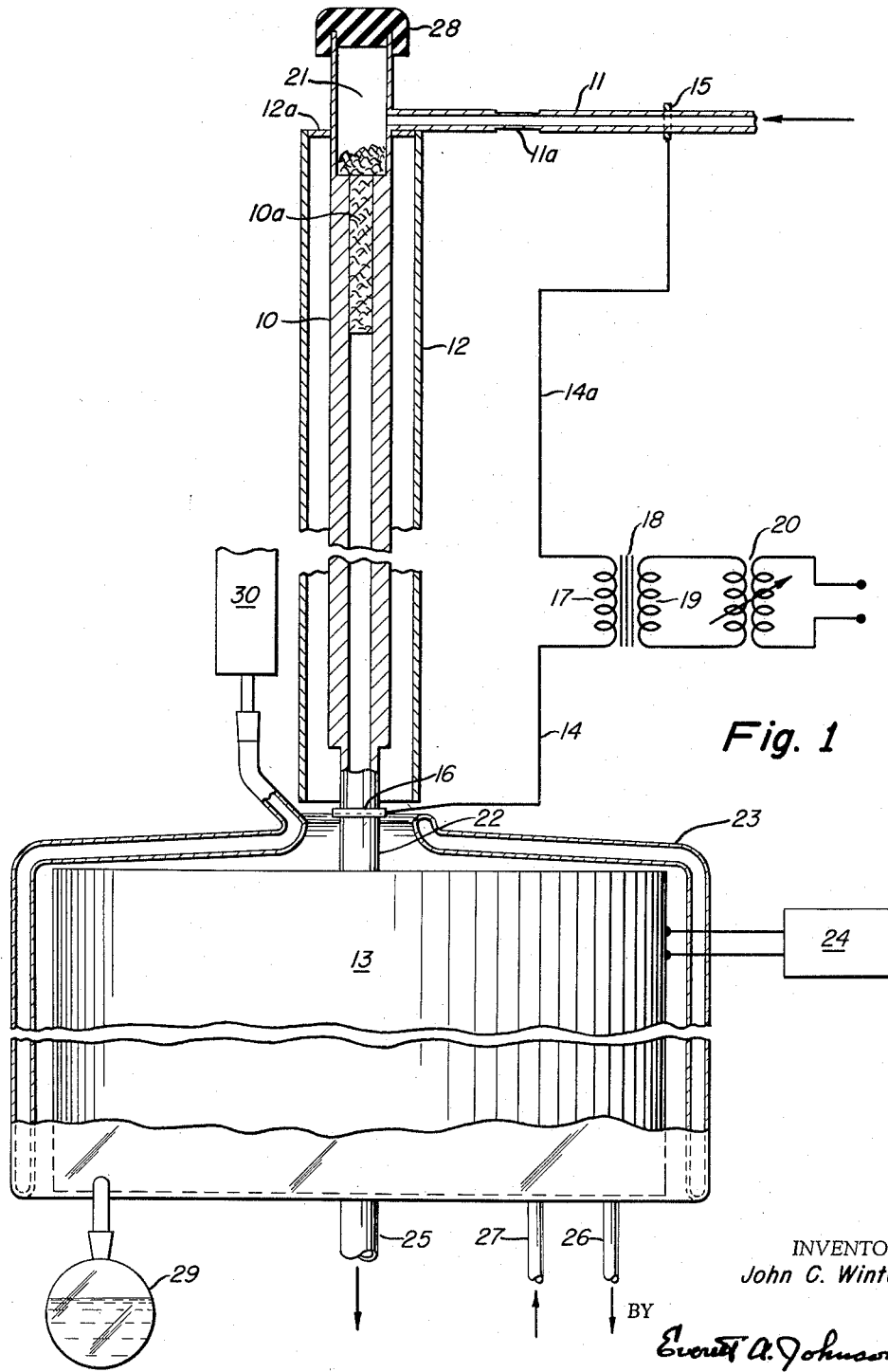

This invention relates to method and means for analyzing fluids and more particularly relates to a system for controlling the temperature of a gas chromatographic analysis.

Gas chromatography, a new and useful technique for the separation and analysis of complex mixtures of volatile materials, is a system wherein components of such mixtures are separated in simple and relatively inexpensive equipment. Analysis can be made on micro samples and the system may also be used for monitoring process streams. The analysis can be made in a relatively short time and the technique is applicable to samples ranging from those that boil below room temperature to those that can be distilled at low pressure.

The separations may take place in small columns packed with liquid stationary phase, adsorbents, modified adsorbents, molecular sieves, complexing agents, or the like. For example, with a liquid stationary phase amounting to about 5–40 weight percent of a solid packing, the liquid is distributed as a thin film but provides a large surface for the gas to contact. Components of a sample are separated as they are carried through the column by a moving gas phase, called the carrier or eluting gas, and the components of the sample are detected as they pass from the column.

Typically in a binary mixture, one of the components may have its vapor pressure altered to a different degree than the other component by the degree and/or kind of physical-chemical forces that operate on it in its relation to the liquid or solid stationary phase. Because of differences in effective vapor pressure, the first and second components emerge from the column in the eluting gas at different times and thus are separated and identified by means of a suitable detector. Such detectors may comprise thermal conductivity cells, gas density balances and other devices sensitive to micro quantities of sample components.

Variables that affect separation include column length and diameter, flow rate, composition and pressure of the eluting gas, the chemical and physical properties of the stationary phase, and the column temperature.

One of the major problems with gas chromatography analyses is the provision of equipment wherein the column temperature can be controlled and varied rapidly. Several systems for such temperature-control have been proposed heretofore, e.g. the column may be enclosed in refluxing vapor or in a heated air cabinet. However, time to reach temperature equilibrium normally involves several hours. In air cabinets, the equilibrium is readily upset by even momentary opening of the cabinet to make adjustments and/or change columns, again requiring long periods to reestablish equilibrium. Such systems, moreover, do not allow changes in column temperature within a reasonable length of time; both systems somewhat restrict the shape and size of the column; and neither system provides for temperature differences within the column itself. In this connection, the best separations are obtained when the analysis is begun with the column at a temperature near the boiling point of the lowest boiling sample component and the column temperature may be steadily increased as the analysis progresses.

It is normally desirable to maintain column temperatures near the boiling point of the component being separated. It is for this reason that it is desirable to be able to vary the temperature of the column during analysis of broad boiling range mixtures.

It is further desirable to regenerate the column by displacing any residual heavy materials at a higher temperature. Furthermore, it is also known that separating efficiencies increase if the sample introduction point is held at a temperature different from the column in which the separation takes place, this temperature generally being higher than in the column.

The detector is operated at an equilibrium temperature and this is desirably near the temperature of the column in order to minimize condensation and absorption of the separated components within the detector cell. In cases where the detector cell has been operated at temperatures significantly below the boiling points of the components being separated in the column, a portion of the component is lost from the analysis by condensation or adsorption within the detector. Heretofore detectors have been enclosed in refluxing vapors or in separately heated cabinets. Such systems, however, have been cumbersome, temperature-control has been difficult, and even with auxiliary heaters and the like have been unsatisfactory.

It is, therefore, a primary object of this invention to provide a system whereby the temperature of the column is easily controlled and rapidly varied. A further object of the invention is to provide such a temperature-control system which is adaptable to any geometric design or size. An additional object of the invention is to provide a column heating system whereby certain sections, such as sample inlet sections, may be heated to a greater or lesser degree than the fractionating or separation section of the column. An important object is to provide preheating of eluting gas. Another object of the invention is to provide a method and means which allows for changes in column temperatures within a reasonable length of time. It is also an object of the invention to provide such a temperature-control system wherein the temperature may be successively and progressively increased or decreased during an analysis. Another object of the invention is to provide versatile and simple temperature-control means adaptable for regenerating the column by displacing remaining heavy materials at a higher temperature than the separating temperature.

An additional object of this invention is to provide an apparatus adapted for maintaining a detector cell used in conjunction with a gas chromatographic analysis column at about the temperature of the column without employing auxiliary heaters and separate controls. A further object of the invention is to provide an apparatus wherein the deficiencies of the systems heretofore proposed are avoided. Another object of the invention is to provide a compact apparatus wherein the detector cell temperature is automatically maintained in a direct relationship with the column temperature. These and other objects of the invention will become apparent as the description thereof proceeds.

Briefly, according to my invention, I provide a column consisting of a gas impervious, electrically conducting material such as stainless steel, the column itself comprising an electrical resistance heating element. Clamped to opposite ends of the column are leads from a step-down transformer secondary coil. The primary coil of the transformer is in turn connected to a variable transformer. This results in the application of high-amperage, low-voltage electrical current through the column.

Higher temperature sections are obtained by making the walls of a particular section of less thickness than adjacent tube portions. Such relatively thin wall sections can be provided by grinding, drilling, cutting, boring or the like. It is also contemplated that the relatively thick and thin wall sections can be provided by building up the tubes in the lower temperature sections.

A draft shield is provided about the stainless steel column and the detector cell is separately enclosed within a vapor jacket or other temperature-control means.

A length of column at the outlet end extends into a detector heating means such as a vapor jacket or electrical heater associated with the detector, this column extension being provided to bring the temperature of the gasiform fluids leaving the column to the equilibrium detector temperature. If desired, the tube walls at the ends of the column may be relatively thin to insure more heat input at the ends and this makes for more uniform temperature throughout the column.

Columns heated by my system respond to temperature changes and stabilize within 60 to 90 seconds. They are not thermally insulated but are protected from convection drafts by an outer sleeve or shield. The columns depend upon a high rate of heat loss for control whereas insulation causes increased time to reach a steady temperature. A further advantage is that the transfer of heat is extremely efficient and requires only about one fourth the wattage used for resistance-wire heating.

In addition, there is a real advantage to heating bulky macro chromatography columns by my system since the size of vapor or liquid jackets or hot air cabinets would be prohibitive. Likewise, multiple columns within the same installation may each be maintained at different temperatures and broad flexibility is obtainable with a minimum of apparatus.

The shape of the columns, i.e. whether they are straight, looped or coiled, is restricted only by factors basic to separation efficiency and there is no influence by the shape of the column on the effectiveness and control of the heating.

The column itself may be coiled about or otherwise enclose the detector cell and the entire unit maintained within a temperature-controlled box or tank-like enclosure, the heat from the resistance-heated column being retained within the enclosure. That portion of the heat not lost through the enclosure walls is thus used to heat the detector. The heat supplied to the detector is therefore in direct proportion to the column temperature level and will maintain this temperature relationship throughout usable temperature ranges.

Advantages and further details of my invention will be described by reference to the accompanying drawing wherein:

FIGURE 1 is a schematic elevation of one embodiment of the invention;

FIGURE 2 is an enlarged fragmentary view of a detector heater;

FIGURE 3 is a schematic elevation, partly in section, of another embodiment of the invention; and FIGURE 4 is a perspective of the unit in FIGURE 3.

Referring to FIGURE 1, I provide a stainless steel column 10 which is electrically conductive. The eluting gas is introduced to the column 10 by conduit 11 also comprised of stainless steel. A draft shield 12 is provided about column 10, the upper end of the shield 12 being provided with draft barrier 12a. The column 10 is heated by operating it as a resistance heating element, the leads 14 and 14a being connected by connectors or clamps 15 and 16 to the conduit 11 and the column 10 so that substantially all of the column functions as a resistance heating element. The leads 14 and 14a are connected to the secondary coil 17 of the transformer 18 and the primary coil 19 of the transformer 18 is connected to a variable transformer 20. Control of the transformer 20 results in the passage of high-amperage, low-voltage electrical current through the column 10.

Localized variations in the temperature of the column 10 may be produced by varying the wall thickness; such apparatus comprising a container having walls of non-uniform cross-sectional area and composed of electrically conducting material. The wall thickness at the ends of the column may be reduced to give a hot sample introduction zone or to eliminate discharge end temperature gradients. Typically, analytical gas chromatography columns are about 0.16 inch (4 mm.) inside diameter, are of stainless steel and have a wall thickness of about 0.015 inch. Such a column may be reamed at the sample point with a 5/32 drill leaving an approximate wall thickness of 0.01 inch. The resulting thinner wall has a higher electrical resistance and consequently the temperature is increased, the extent of temperature increase being determined by the amount of metal removed from the tubing wall.

To attain temperatures up to about 250° C., we may apply 4 to 6 volts from transformer 18 to column 10, causing about 19 to 21 amps to flow through column 10, the upper temperature being limited only by the capacity of the transformer 20. Electrical connection to the column 10 may be by leads 14 and 14a and alligator clamps 15 and 16. One clamp 15 may be to the conduit 11 and the other clamp 16 is connected to column 10, thereby providing heating of the eluting gas supplied by conduit 11 at or about the temperature of the column 10. The conduit 11 may have a section 11a of relatively thin wall construction so as to provide rapid pre-heat of eluting gas.

The sample is introduced into the column 10 by means of sample inlet 21 at the upper end of the column 10 containing a sorbent mass 10a, and provided with an inlet closure 28 which may comprise a rubber cap, cork, or the like. The sample inlet may be of the "lock-hopper" type, may be a plug-in barrel type of valve, etc. The inlet end of column 10 may be made of thinner wall construction in order to provide higher than average temperature at the sample introduction point.

The lower end of the column 10 is provided with a thin-walled extension 22 of the column 10 which passes through the vapor jacket 23 and discharges into the detector cell 13. The eluting gas introduced by conduit 11 is discharged from the cell 13 through vent line 25. Vapors are generated by the heated boiling flask 29 and are condensed by condenser 30 after passing through the vapor jacket 23. As described, the vapor jacket 23 also serves to bring the eluting gas in column 10 to the temperature of the detector cell 13 regardless of the temperature of column 10. An electrical measuring circuit and recorder 24 receives the signal from the detector cell 13 and indicates continuously the presence or absence of a separated component of the sample under test.

When applied to macro operations, a small portion of the elution gas and component vapor may be shunted to the detector cell 13 with the remainder bypassing the detector cell 13 to a freeze-out trap (not shown). Otherwise the operation of a macro column is as described above.

In FIGURE 2, the detector 13 of FIGURE 1 is enclosed within a detector heating housing 50 made of thin wall resistance conductor, a heavy conductor band 51 and relatively heavy top plate 52. An electrical conductor 53 extends between the housing 50 and the column 10 as described in FIGURE 1. The draft shield 12 is provided with enlargement 54 to accommodate cell 13 and closed at its lower end by removable plate 55 through which pass vent line 25, the reference gas lines 26 and 27, and the necessary electrical conduits associated with the recorder 24. A disc-like draft barrier 56 is provided between column 10 and the shield 12.

Even though the detector 13 will not necessarily have the same temperature as the column 10 containing a sorbent mass 10a, the temperature will vary in a direct relationship with the temperature ratio of column 10 to detector 13 being determined by the relative electrical resistance of the housing 50 and the column 10.

Referring to FIGURES 3 and 4, eluting gas enters the coiled column 35 by way of inlet conduit 36 and exits from the column 35 through outlet line 37, discharging into detector cell 38. The sample gases exit from cell 38 by line 39. Reference gas enters cell 38 by line 40 and exits therefrom by line 41.

The sample is introduced via port 42 into column 35, the port 42 being provided with a suitable closure 42a. The entire assembly of column 35, cell 38, port 42, and the lines 39, 40 and 41 are enclosed within heat-insulated cabinet 43.

The column 35 is heated by electrical resistance, electrical connections 44 and 45 from secondary of transformer 46 being connected to the column 35 adjacent the outlet 37 and the inlet 36. The primary of transformer 46 is connected to the secondary of variable transformer 47 whose primary is in turn connected by leads 48 to power supply 49.

Inlet line 36 may be of thinner wall construction than the column 35 so that electrical current applied thereto by electrical connections 44 and 45 will raise the temperature of the inlet line 36 and provide rapid pre-heating of eluting gas. Likewise, the thickness of the wall of the inlet end of the column 35 at the point of junction with the port 42 may be less than that of the column 35 itself so as to provide higher than average temperature at the sample introduction point. Temperature gradients can also be reduced at the electrical connections 44 and 45 by thinning the walls of inlet and outlet lines 36 and 37 in the region of the connections.

When employing a detector 13 having electrically isolated detector elements (not shown), all of the line, column and cell connections may be of metal. However, if the detector 13 is of the type employing nonisolated detector elements, it may be necessary to provide a nonconducting connector between the discharge end of column 10 and the inlet of cell 13.

Although the invention has been described with reference to an embodiment thereof, it should be understood that this is by way of illustration only and that the invention is not necessarily limited to such embodiment. Alternative components and operating techniques will become apparent to those skilled in the art in view of the foregoing disclosure and, accordingly, modifications in the construction and operation of the apparatus are contemplated without departing from the spirit of my invention.

What I claim is:

1. An apparatus for effecting the separation of complex vaporizable mixtures which comprises in combination an elongated container, said container being comprised of electrically-conducting material, means for flowing a carrier gas through said container, detector means arranged to receive the effluent from one end of said container, means for applying electric heating current to said container, portions of said container being of substantially less thickness than adjacent wall portions whereby such portions are maintained at relatively higher temperature than the balance of the container, and means for maintaining said detector means at a uniform temperature.

2. The apparatus of claim 1 wherein said means for applying electrical heating current includes a power source, a variable transformer, a step-down transformer, the primary coil of the step-down transformer being connected to the secondary of the said variable transformer, and current leads clamped to spaced portions of said container, said leads being connected to the secondary coil of the said step-down transformer.

3. The apparatus of claim 1 including means for passing the electric heating current over substantially the entire length of the container and being provided with an elongated shield means spaced from and substantially co-extensive with the length of said container.

4. The apparatus of claim 1 which includes means for charging such a complex vaporizable mixture to one end of the container for transport therein by said carrier gas.

5. An apparatus for effecting the separation of complex vaporizable mixtures which comprises in combination an elongated container comprised of electrically-conducting material, means for flowing carrier gas through said container, means for injecting known volumes of such mixtures into said container, detector means arranged to receive the total effluent from said container, clamp means for applying electric heating current across the inlet and outlet of said container, draft shield means spaced about said container, means for maintaining said detector at a temperature in equilibrium with container, and relatively thin-walled conduit means at the inlet of said container maintained at relatively higher temperature than the balance of the container by the application of the said heating current.

6. A system for separating complex fluid mixtures which comprises a elongated container, said container being gas impervious and comprised of electrically conducting material, a mass of adsorbent material in said container, means for flowing a carrier gas through said container and said mass, means for charging into said container a quantity of a mixture to be separated, means for analyzing the combined carrier gas and a separated component of the mixture, said means for analyzing being adapted to receive the entire flow from said container, means for applying electrical heating current over the length of said container, sections of said container having relatively thin wall portions of relatively high electrical resistance whereby zones of high temperature are provided, and draft shield means about said container.

7. A system for separating complex fluid mixtures which comprises a mass of a sorbent material, an elongated container for said mass having an inlet end and an outlet end, said container being gas-impervious and electrically-conducting, means for flowing a carrier gas through said container, means for charging a quantity of such fluid mixture to the container adjacent the inlet end thereof, means for analyzing the entire flow from the outlet end of said container, means for applying electrical heating current over the length of said container, sections for said container having relatively thin wall portions of relatively high electrical resistance whereby zones of high temperature are provided through which the carrier gas and the complex fluid mixtures to be analyzed flow in series, and draft shield means disposed about said container and substantially co-extensive with the length thereof.

8. A system for separating complex fluid mixtures which comprises means for flowing such mixtures over a stationary sorbent material arranged within a tubular member composed of electrically conducting material and having relatively thick and relatively thin intermediate and terminal wall portions, means for charging a quantity of such fluid mixture to a terminal portion of said tubular member, means communicating with another terminal portion of said member for analyzing the effluent therefrom, and means for maintaining a temperature differential between said portions thereof, including means for passing an electrical heating current through the walls of said member over substantially the length thereof whereby components of said mixtures are progressively discharged from said member and detected by said analyser.

9. In a system for separating complex fluid mixtures wherein said mixtures are passed over a stationary liquid phase confined within a container providing an elongated path, the improved apparatus comprising a container having relatively thick and relatively thin intermediate and terminal wall portions composed of electrically conducting material, means for charging a quantity of such fluid mixture to said container, means for analyzing the effluent from said container, means for maintaining a temperature differential between such portions thereof, and means for passing a variable electrical heating current along said portions of said container, a higher temperature being maintained in a terminal portion of the flow path through said container by virtue of the differential dimensions of the electrical conducting wall portions.

10. An apparatus for effecting the separation of complex vaporizable mixtures which comprises in combination an electrically conducting container having an elongated flow path therein, sorbent material in said container along said path, means for charging a quantity of a mixture to be analyzed to the container adjacent a terminal portion thereof, means for flowing carrier gas through said container along said path, means for passing electrical heating current over substantially the length of said path, means for varying the heating effect of the current applied to said container, said means for varying the heating effect of the applied current including axially displaced portions of said container having a cross-sectional wall areas which differ, a section of greater cross-sectional wall area providing a zone of lower temperature for a given applied current, detector means arranged to receive the total effluent from another terminal portion of said container, said terminal wall portions being of lesser cross-sectional area than an intermediate wall portion whereby a higher temperature is maintained in said terminal portions, and means for maintaining said detector means at a uniform elevated temperature.

References Cited in the file of this patent

UNITED STATES PATENTS

| | | |
|---|---|---|
| 2,387,479 | Todd | Oct. 23, 1945 |
| 2,398,818 | Turner | Apr. 23, 1946 |
| 2,478,917 | Hain | Aug. 16, 1949 |
| 2,826,908 | Skarstrom | Mar. 18, 1958 |

FOREIGN PATENTS

| | | |
|---|---|---|
| 552,591 | Great Britain | Apr. 15, 1943 |
| 123,512 | Australia | Feb. 20, 1947 |
| 1,078,592 | France | May 12, 1954 |

OTHER REFERENCES

Book-Vapor Phase Chromatography, by Desty, Butterworth's Scientific Publications, London, 1956, page 217. (Copy in Patent Office Library.)